United States Patent
Hindman et al.

(10) Patent No.: US 9,126,598 B2
(45) Date of Patent: Sep. 8, 2015

(54) POWER MANAGEMENT FOR INFINITELY VARIABLE TRANSMISSION (IVT) EQUIPPED MACHINES

(75) Inventors: Jahmy Hindman, Rickardsville, IA (US); Eric R Anderson, Galena, IL (US); Chris Maifield, Dubuque, IA (US); Christopher G Parish, Ashbury, IA (US); Jeremiah J Bock, Ashbury, IA (US); Daniel Pflieger, East Dubuque, IL (US); Kevin L Pfohl, Dickeyville, WI (US); Clayton G Janasek, Independence, KS (US); Briton T Eastman, Coffeyville, KS (US); Michael D Testerman, Dearing, KS (US); Michael L Frank, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 2158 days.

(21) Appl. No.: 11/446,626

(22) Filed: Jun. 5, 2006

(65) Prior Publication Data

US 2007/0281826 A1 Dec. 6, 2007

(51) Int. Cl.
*G06F 7/00* (2006.01)
*B60W 30/188* (2012.01)
*B60W 10/06* (2006.01)
*B60W 10/103* (2012.01)
*B60W 30/184* (2012.01)
*F16H 61/478* (2010.01)

(52) U.S. Cl.
CPC ............ *B60W 30/188* (2013.01); *B60W 10/06* (2013.01); *B60W 10/103* (2013.01); *B60W 30/184* (2013.01); *B60W 30/1886* (2013.01); *B60W 2300/18* (2013.01); *B60W 2510/0638* (2013.01); *B60W 2710/0677* (2013.01); *B60W 2720/10* (2013.01); *B60W 2720/28* (2013.01); *F16H 61/478* (2013.01); *Y10T 477/6407* (2015.01)

(58) Field of Classification Search
CPC .............. B60W 10/06; B60W 10/103; B60W 2710/0677; B60W 30/188; B60W 30/184; B60W 30/1886; B60W 2720/10; B60W 2720/28
USPC ..................... 701/50, 51, 54, 36, 99
See application file for complete search history.

(56) References Cited

U.S. PATENT DOCUMENTS 3,303,901 A * 2/1967 Schou ............................ 180/6.2
5,201,629 A * 4/1993 Simpson et al. ............... 414/632
5,535,830 A * 7/1996 Matsushita et al. ................ 172/7
5,564,507 A * 10/1996 Matsushita et al. ................ 172/3

(Continued)

OTHER PUBLICATIONS

Non-Final Office Action dated Feb. 4, 2010 for U.S. Appl. No. 11/536,892, filed Sep. 29, 2006; First Named Inventor, Eric R. Anderson.

(Continued)

*Primary Examiner* — Thomas G Black
*Assistant Examiner* — Sze-Hon Kong

(57) ABSTRACT

The invention relates to power management of a off-highway vehicle. A power management apparatus is described as a vehicle control unit coupled to a vehicle and the vehicle control unit is in communication with an engine and a transmission controller. In response to power management input, the vehicle control unit sends a message to the transmission controller commanding a maximum torque limit based on the maximum drivetrain torque. The maximum torque limit is configured to optimize power to the vehicle implement.

19 Claims, 5 Drawing Sheets

(56) References Cited

U.S. PATENT DOCUMENTS

| | | | |
|---|---|---|---|
| 5,730,678 A | 3/1998 | Larkin | |
| 5,748,097 A | 5/1998 | Collins | |
| 5,868,640 A | 2/1999 | Coutant | |
| 5,941,361 A * | 8/1999 | Davidovich et al. | 192/220.1 |
| 5,968,103 A * | 10/1999 | Rocke | 701/50 |
| 5,983,151 A * | 11/1999 | Okada et al. | 701/50 |
| 5,989,154 A * | 11/1999 | Christensen et al. | 477/111 |
| 6,203,463 B1 | 3/2001 | Casey et al. | |
| 6,205,385 B1 * | 3/2001 | Stelzle et al. | 701/50 |
| 6,208,925 B1 * | 3/2001 | Creger et al. | 701/51 |
| 6,234,508 B1 * | 5/2001 | Tuttle et al. | 280/406.1 |
| 6,309,323 B1 * | 10/2001 | Steeby | 477/111 |
| 6,314,727 B1 * | 11/2001 | Prabhu et al. | 60/431 |
| 6,371,882 B1 | 4/2002 | Casey et al. | |
| RE37,703 E * | 5/2002 | Bellinger | 477/111 |
| 6,385,519 B2 * | 5/2002 | Rocke | 701/50 |
| 6,424,902 B1 * | 7/2002 | Kuras | 701/51 |
| 6,427,107 B1 * | 7/2002 | Chiu et al. | 701/50 |
| 6,440,038 B1 * | 8/2002 | Holloway | 477/54 |
| 6,609,056 B1 * | 8/2003 | Czarnecki et al. | 701/51 |
| 6,636,795 B1 * | 10/2003 | Morscheck | 701/54 |
| 6,663,535 B2 * | 12/2003 | Holloway | 477/110 |
| 6,735,889 B1 | 5/2004 | Berger et al. | |
| 6,745,117 B1 * | 6/2004 | Thacher et al. | 701/50 |
| 6,807,474 B2 * | 10/2004 | Bergqvist et al. | 701/84 |
| 6,854,549 B2 * | 2/2005 | Calamari et al. | 180/179 |
| 6,904,993 B1 | 6/2005 | Rinck et al. | |
| 6,957,139 B2 * | 10/2005 | Bellinger | 701/104 |
| 6,963,796 B2 * | 11/2005 | Larson et al. | 701/36 |
| 7,222,014 B2 * | 5/2007 | Tao et al. | 701/87 |
| 7,320,217 B2 * | 1/2008 | Yasuda et al. | 60/468 |
| 7,399,255 B1 * | 7/2008 | Johnson et al. | 477/42 |
| 7,519,462 B2 * | 4/2009 | Brown et al. | 701/50 |
| 7,555,855 B2 * | 7/2009 | Alshaer et al. | 37/382 |
| 7,677,323 B2 * | 3/2010 | Stratton et al. | 172/7 |
| 7,797,092 B2 * | 9/2010 | Schifferer et al. | 701/50 |
| 7,856,301 B2 * | 12/2010 | Sjogren et al. | 701/50 |
| 2004/0117092 A1 * | 6/2004 | Budde | 701/50 |
| 2004/0143383 A1 * | 7/2004 | Kuepper et al. | 701/51 |
| 2005/0075773 A1 * | 4/2005 | Schweizer et al. | 701/51 |
| 2005/0102082 A1 * | 5/2005 | Joe et al. | 701/54 |
| 2005/0160727 A1 * | 7/2005 | Nakamura et al. | 60/431 |
| 2006/0018765 A1 * | 1/2006 | Fransson et al. | 417/213 |
| 2006/0065465 A1 * | 3/2006 | Lunzman et al. | 180/242 |
| 2006/0105883 A1 * | 5/2006 | Krisher et al. | 477/175 |
| 2006/0234829 A1 * | 10/2006 | Berger et al. | 477/52 |
| 2008/0034853 A1 | 2/2008 | Tabor et al. | |
| 2008/0082239 A1 | 4/2008 | Anderson | |

OTHER PUBLICATIONS

Amendment to Non-Final Office Action filed May 4, 2010 for U.S. Appl. No. 11/536,892, filed Sep. 29, 2006; First Named Inventor, Eric R. Anderson.

* cited by examiner

POWER MANAGEMENT FOR INFINITELY VARIABLE TRANSMISSION (IVT) EQUIPPED MACHINES

FIELD OF THE INVENTION

This invention relates to machine performance optimization for off-highway vehicles. In particular this invention utilizes the ability to command a maximum torque limit for a drivetrain to optimize machine performance.

BACKGROUND AND SUMMARY OF THE INVENTION

In a typical wheel loader vehicle the ratio of power split between the drivetrain and the hydraulic system is governed by a typical torque converter. The relationship of this power split is fixed for the life of the vehicle by the torque converter's operating characteristics. A torque converter limits power to the drivetrain when the converter input shaft is turning at engine speed and the converter output shaft is at a near zero speed. In this condition the vehicle's wheels are not turning but are transmitting torque to the ground, hereinafter this is referred to as a "stall" condition. Essentially during this condition the excess power from the engine is being converted to heat and results in wasted fuel.

Infinitely Variable Transmissions (IVT) or hydrostatic transmissions are much more efficient at this "stall" condition compared to a torque converter transmission. However, they can generate relatively too much power and very high crowd force at low ground speeds. Crowd force is defined as the amount of force with which a vehicle drives into a pile of material. Because of this, a wheel loader with an IVT or hydrostatic transmission will typically provide the hydraulic system with insufficient power. For example, a vehicle implement may try to load a pile of material and the vehicle implement may become trapped in the material because of the high crowd force. This could be due to an incorrect balance between available power for the hydraulic system and the power delivered to the drivetrain. In this condition the wheel loader's ability to move material efficiently is reduced. What is needed in the art is a system for varying and limiting the amount of power and/or torque delivered to the drivetrain.

The present invention provides a system for varying and limiting drivetrain power in an efficient manner. In accordance with one aspect of the present invention, a power management apparatus for a off-highway vehicle includes a vehicle control unit in communication with the vehicle's engine controller, transmission controller and power management actuator, wherein in response to different kinds of data or input, the vehicle control unit sends a message to the transmission controller regarding a maximum torque limit. Power management actuator includes, but is not limited to, a foot pedal.

In accordance with another aspect of the present invention, the system includes a vehicle control unit in communication with the vehicle's engine controller, transmission controller, power management actuator, implement control lever and implement velocity sensor, wherein in response to implement velocity information, the vehicle control unit sends a message to the transmission controller regarding a maximum torque limit.

BRIEF DESCRIPTION OF THE DRAWINGS

The above-mentioned and other features of this invention, and the manner of attaining them, will become more apparent and the invention itself will be better understood by reference to the following description of embodiments of the invention taken in conjunction with the accompanying drawings, wherein.

Figure 1:
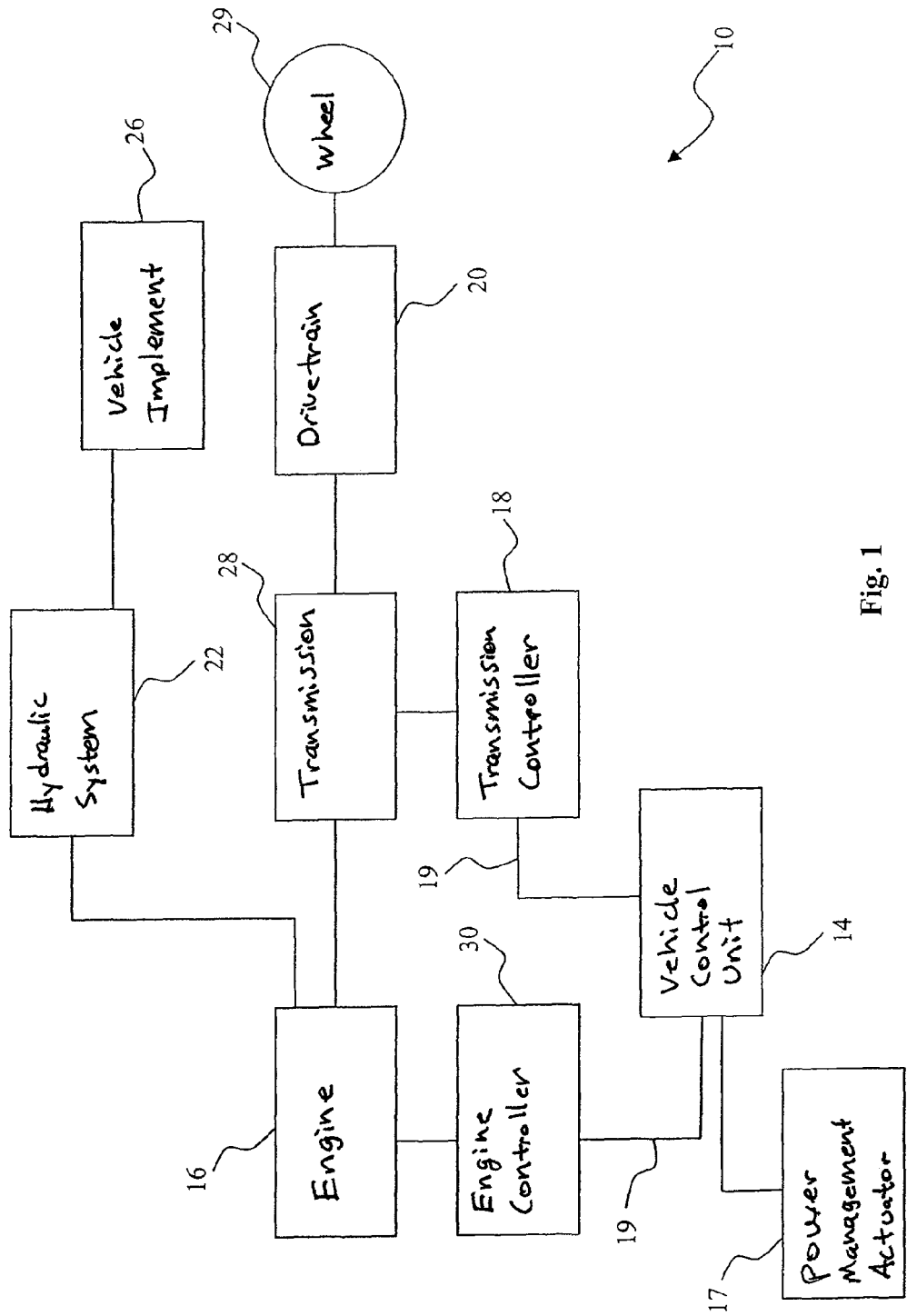
FIG. 1 is a perspective view of an illustrative embodiment of the power management system.

Corresponding reference characters indicate corresponding parts throughout the several views. Although the drawings represent embodiments of the present invention, the drawings are not necessarily to scale and certain features may be exaggerated in order to better illustrate and explain the present invention.

DETAILED DESCRIPTION OF THE DRAWINGS

The embodiments disclosed below are not intended to be exhaustive or limit the invention to the precise forms disclosed in the following detailed description. Rather, the embodiments are chosen and described so that others skilled in the art may utilize their teachings.

FIG. 1 shows a wheel loader vehicle including engine controller 30 for controlling engine 16, hydraulic system 22 including vehicle implement 26, transmission controller 18 for controlling drivetrain 20 and a power management system 10 including vehicle control unit 14. A vehicle implement 26 may be a boom. Vehicle control unit 14 is in communication with engine controller 30, transmission controller 18 and power management actuator 17.

Transmission controller 18 is coupled to transmission 28 and operably coupled to drivetrain 20 as well as wheel 29. Transmission controller obtains vehicle ground speed. Transmission controller 18 may broadcast vehicle ground speed data to vehicle control unit 14 over a communication network 19 such as a controller area network (CAN). In this way, vehicle control unit 14 obtains vehicle ground speed data.

In a first embodiment illustrated by FIG. 1, vehicle control unit 14 uses vehicle ground speed data to determine a maximum drivetrain torque. Vehicle control unit 14 includes a first subroutine.

Figure 4:
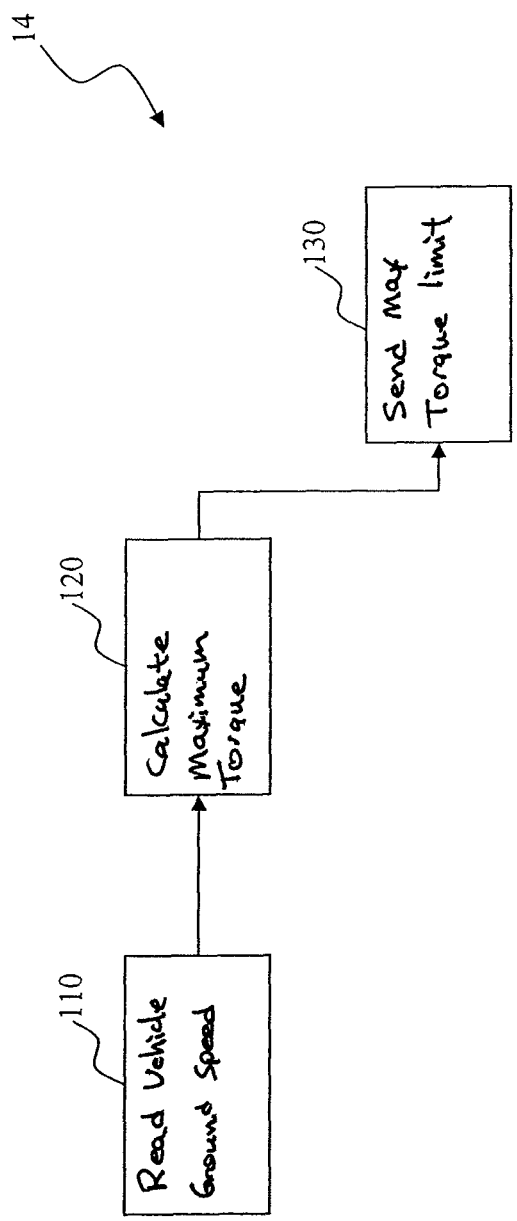
FIG. 4 is a software flow diagram of an illustrative embodiment of the power management system.

The operation of the first embodiment of power management system 10 results in the logic flow illustrated by FIG. 4. At step 110, vehicle control unit 14 reads input of a vehicle ground speed. At step 120, vehicle control unit 14 calculates the maximum drivetrain torque using the first subroutine. At step 130, vehicle control unit 14 considers the maximum drivetrain torque and sends a message to the transmission controller (not shown) regarding a maximum torque limit.

A second embodiment includes the same features as the first embodiment. The second embodiment further includes the following features. In the second embodiment, also illustrated by FIG. 1, engine controller 30 is operably coupled to engine 16. Engine controller 30 obtains actual engine speed. Engine controller 30 broadcasts actual engine speed to vehicle control unit 14 over a communication network 19 such as a controller area network (CAN). In this way, vehicle control unit 14 obtains actual engine speed. Vehicle control unit 14 includes a second subroutine where based on an input of the actual engine speed an output of maximum drivetrain torque is determined.

Figure 5:
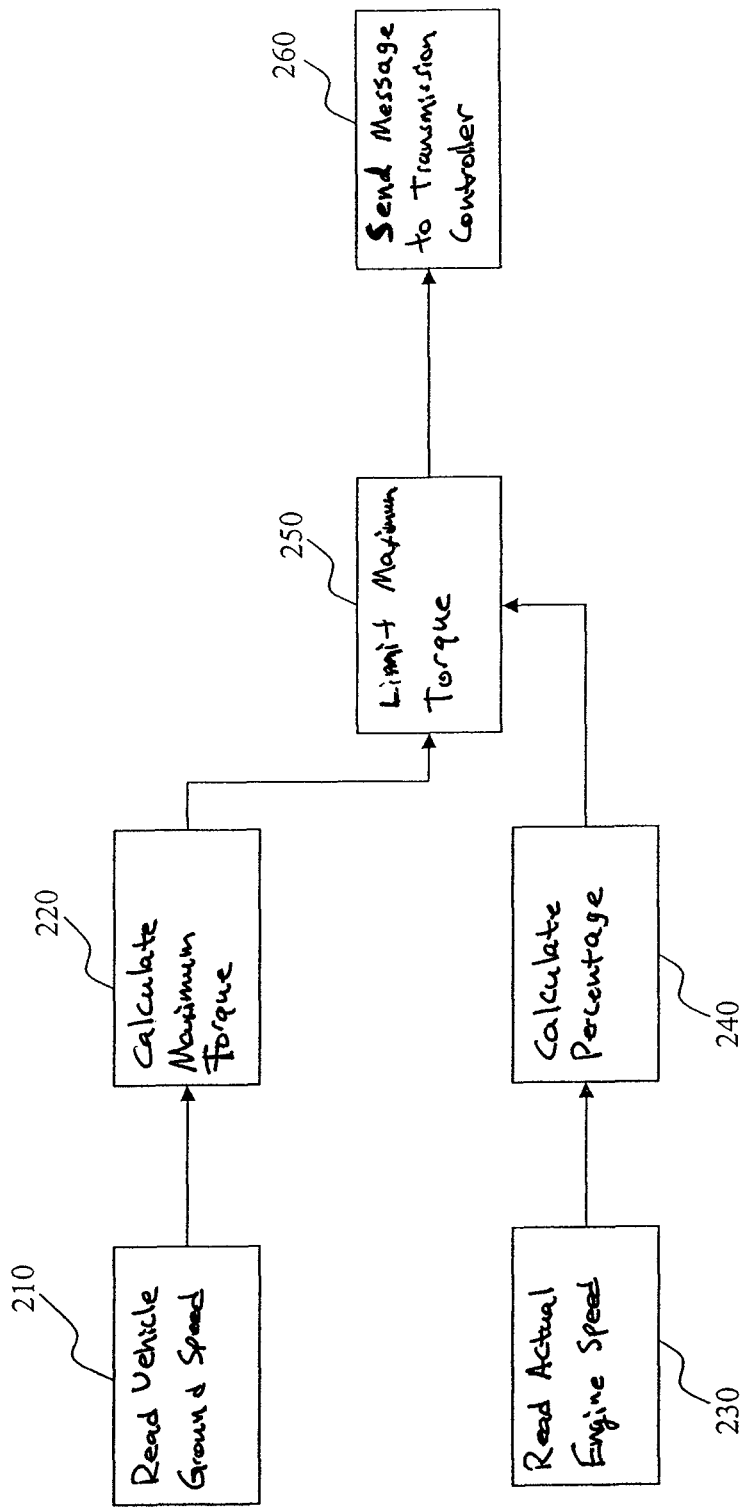
FIG. 5 is a software flow diagram of several alternative embodiments of the power management system.

The operation of the second embodiment results in a version of the logic flow illustrated by FIG. 5. At step 210, vehicle control unit 14 reads input of a vehicle ground speed. At step 220, vehicle control unit 14 calculates the maximum drivetrain torque using the first subroutine. At step 230, vehicle control unit 14 reads input of the actual engine speed. At step 240, vehicle control unit 14 considers the maximum drivetrain torque and calculates a percent value using the second subroutine. At step 250, vehicle control unit 14 possibly limits the maximum drivetrain torque based on the percent value. At step 260, vehicle control unit 14 sends a message to the transmission controller regarding a maximum torque limit.

Vehicle control unit 14 considers actual engine speed in order to possibly limit a maximum torque limit commanded of transmission controller 18. Calculation of the maximum torque limit reduction may involve any mathematical relation including any one or combination of the following mathematical concepts: addition, subtraction, multiplication, and/or division. For example, vehicle control unit 14 uses vehicle ground speed data and determines a maximum drivetrain torque of X. Vehicle control unit 14 then uses actual engine speed and sends a message commanding a maximum torque limit possibly limited by, for example, 10% of X due to consideration of actual engine speed.

A third embodiment includes the same features as the first embodiment. The third embodiment further includes the following features. In a third embodiment, also illustrated by FIG. 1, power management actuator 17 is operably coupled to vehicle control unit 14. Power management actuator 17 includes any one of the group of a pedal, a button or a hand-actuated lever. Power management actuator 17 broadcasts power management input about vehicle implement 26 over a communication network 19 such as a controller area network (CAN). In this way, vehicle control unit 14 obtains power management input. Vehicle control unit 14 includes a third subroutine where based on power management input an output of maximum drivetrain torque is determined.

The operation of the third embodiment results in an alternative version of the logic flow illustrated by FIG. 5. For the third embodiment, steps 210, 220, 250 and 260 are the same as the second embodiment. At step 230, vehicle control unit 14 reads power management input. At step 240, vehicle control unit 14 considers the maximum drivetrain torque and calculates a percent value using the third subroutine.

After using power management input, vehicle control unit 14 possibly derates a maximum torque limit commanded of transmission controller 18. For example, vehicle control unit 14 uses vehicle ground speed data and determines a maximum drivetrain torque of X. Vehicle control unit 14 then uses power management input and sends a message commanding a maximum torque limit possibly limited by, for example, 10% of X due to consideration of power management input.

Figure 2:
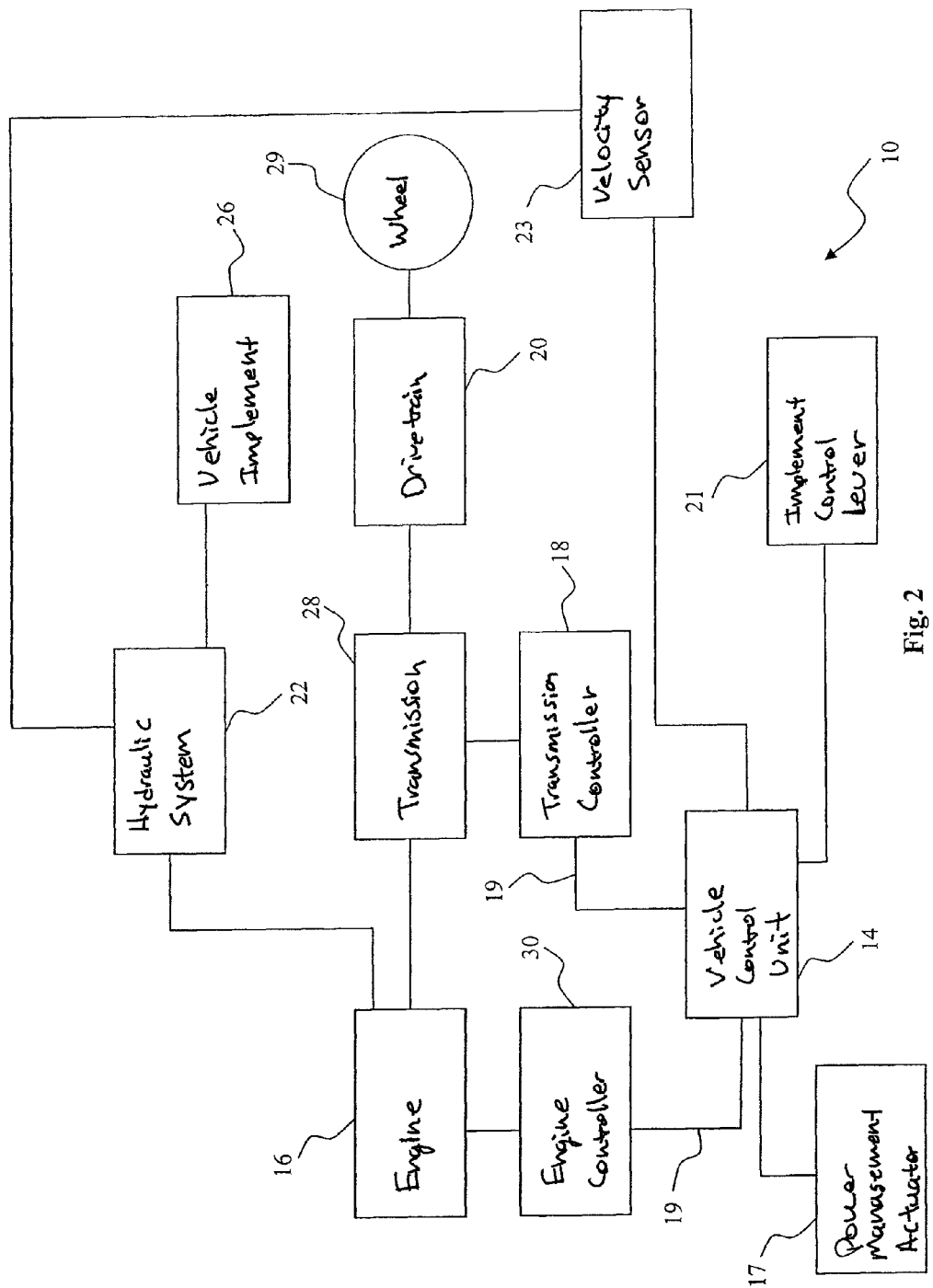
FIG. 2 is a perspective view of an alternative embodiment of the power management system.
Figure 3:
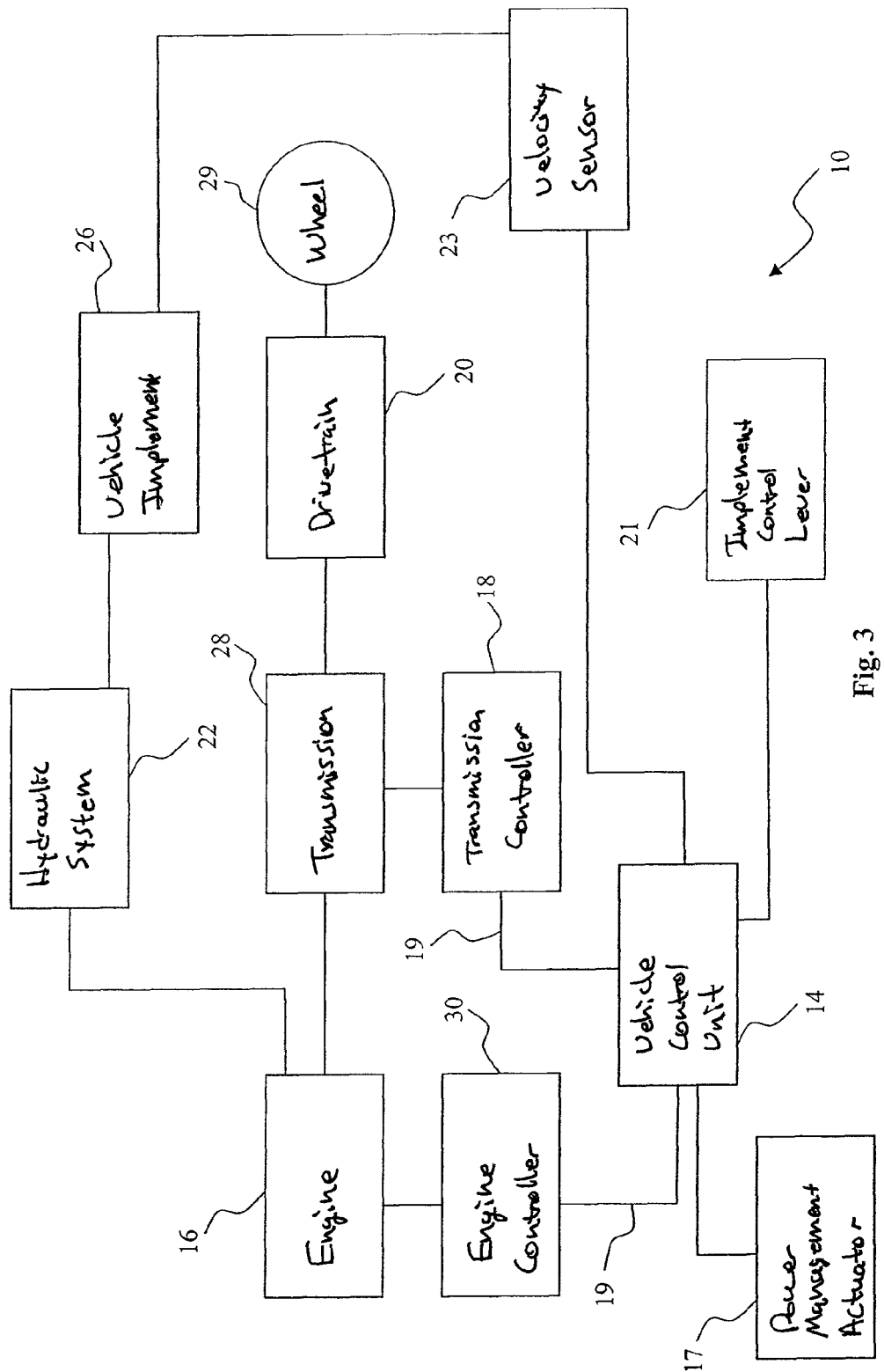
FIG. 3 is a perspective view of an alternative embodiment of the power management system.

A fourth embodiment includes the same features as the first embodiment. The fourth embodiment further includes the following features. In the fourth embodiment, vehicle control unit 14 further includes communication with an implement control lever 21 and at least one implement velocity sensor 23. For an exemplary embodiment disclosed in FIG. 2, implement velocity sensor 23 includes cylinder position sensors or flow meters in a circuit connected to the cylinders for the vehicle implement 26. For an exemplary embodiment disclosed in FIG. 3, implement velocity sensor 23 includes cylinder position sensors or flow meters.

Vehicle control unit 14 includes a fourth subroutine where based on an implement velocity data an output of maximum drivetrain torque is determined. Vehicle control unit 14 considers implement velocity data before sending a message commanding a maximum torque limit if the position of implement control lever 21 is commanding movement of vehicle implement 26.

The operation of the fourth embodiment results in an alternative version of the logic flow illustrated by FIG. 5. For the fourth embodiment, steps 210, 220, 250 and 260 are the same as the second and third embodiments. At step 230, vehicle control unit 14 can read implement velocity data. At step 240, vehicle control unit 14 considers the maximum drivetrain torque and calculates a percent value using the fourth subroutine.

A fifth embodiment includes the same features as the second and third embodiments. The operation of the fifth embodiment results in an alternative version of the logic flow illustrated by FIG. 5. For the fifth embodiment, steps 210, 220, 250 and 260 are the same as the second and third embodiments. At step 230, vehicle control unit 14 reads input of the actual engine speed and power management input. At step 240, vehicle control unit 14 considers the maximum drivetrain torque and calculates a percent value or multiple percent values using the second and third subroutines. A formula multiplies results obtained from use of any one of the combination of subroutines.

A sixth embodiment includes the same features as the second and fourth embodiments. The operation of the sixth embodiment results in an alternative version of the logic flow illustrated by FIG. 5. For the sixth embodiment, steps 210, 220, 250 and 260 are the same as the second, third and fourth embodiments. At step 230, vehicle control unit 14 reads input of the actual engine speed and implement velocity data. At step 240, vehicle control unit 14 considers the maximum drivetrain torque and calculates a percent value or multiple percent values using the second and fourth subroutines. A formula multiplies results obtained from use of any one of the combination of subroutines.

A seventh embodiment includes the same features as the third and fourth embodiments. The operation of the seventh embodiment results in an alternative version of the logic flow illustrated by FIG. 5. For the seventh embodiment, steps 210, 220, 250 and 260 are the same as the third and fourth embodiments. At step 230, vehicle control unit 14 reads input of the power management input and implement velocity data. At step 240, vehicle control unit 14 considers the maximum drivetrain torque and calculates a percent value or multiple percent values using the third and fourth subroutines. A formula multiplies results obtained from use of any one of the combination of subroutines.

A eighth embodiment includes the same features as the second, third and fourth embodiments. The operation of the eighth embodiment results in an alternative version of the logic flow illustrated by FIG. 5. For the eighth embodiment, steps 210, 220, 250 and 260 are the same as the second, third and fourth embodiments. At step 230, vehicle control unit 14 reads input of the actual engine speed, power management input and implement velocity data. At step 240, vehicle control unit 14 considers the maximum drivetrain torque and calculates a percent value or multiple percent values using the second, third and fourth subroutines. A formula multiplies results obtained from use of any one of the combination of subroutines.

Operation of power management system 10, especially during operation of vehicle implement 26, usually benefits from shifting power from drivetrain 20 to vehicle implement 26. Essentially engine 16 produces the total power for the entire system. The amount of power provided to drivetrain 20 is a portion of the total power provided by engine 16 and inversely proportional to the amount of power provided to hydraulic system 22. Similarly, the amount of power provided to hydraulic system 22 is proportional to the total power provided by engine 16 and inversely proportional to the amount of power provided to drivetrain 20. Hydraulic system 22 provides power to vehicle implement 26. Power management system 10 gives the best balance when proportioning of power supplied to drivetrain 20 and the hydraulic system 22 and therefore vehicle implement 26.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A construction vehicle including
at least one traction device,
an engine,
an engine controller operably coupled to the engine,
a drivetrain operably coupled to the at least one traction device and engine for powering the at least one traction device,
a transmission controller operably coupled to the drivetrain and configured to obtain a ground speed of the vehicle,
a boom implement configured to be raised and lowered to move material,
a hydraulic system for providing power to the boom implement, and
a power management apparatus including a vehicle control unit in communication with the engine controller, the transmission controller and a power management actuator, wherein the vehicle control unit determines a maximum drivetrain torque for the ground speed obtained by the transmission controller and sends a message to the transmission controller regarding the maximum drivetrain torque, the transmission controller preventing too much power from being delivered to the drivetrain for the ground speed obtained by the transmission controller by reducing engine power to the transmission and increasing engine power to the hydraulic system and the boom implement.

2. The construction vehicle of claim 1, wherein the vehicle control unit further includes a first subroutine, wherein the vehicle control unit obtains the ground speed of the vehicle from the transmission controller, wherein the vehicle control unit uses the first subroutine and the ground speed of the vehicle to determine the maximum drivetrain torque.

3. The construction vehicle of claim 2, wherein the vehicle control unit further includes a second subroutine, wherein the vehicle control unit obtains engine speed data from the engine controller, wherein the second subroutine of the vehicle control unit uses the engine speed data to limit the maximum drivetrain torque.

4. The construction vehicle of claim 3, wherein the vehicle control unit further includes a third subroutine, wherein the vehicle control unit obtains a power management input from the power management actuator, wherein the third subroutine of the vehicle control unit uses the power management input to limit the maximum drivetrain torque.

5. The construction vehicle of claim 4, wherein the vehicle control unit further includes an implement control lever and at least one implement velocity sensor, wherein the vehicle control unit obtains position information from the implement control lever.

6. The construction vehicle of claim 5, wherein the vehicle control unit further includes a fourth subroutine, wherein the vehicle control unit obtains velocity information from the at least one implement velocity sensor, wherein the fourth subroutine of the vehicle control unit uses the velocity information to limit the maximum drivetrain torque.

7. The construction vehicle of claim 4, wherein the power management actuator includes a pedal.

8. The construction vehicle of claim 2, wherein the vehicle control unit further includes a second subroutine, wherein the vehicle control unit obtains a power management input from the power management actuator, wherein the second subroutine of the vehicle control unit uses the power management input to limit the maximum drivetrain torque.

9. The construction vehicle of claim 2, wherein the vehicle control unit further includes an implement control lever and at least one implement velocity sensor, wherein the vehicle control unit obtains position information from the implement control lever, wherein the vehicle control unit further comprises a second subroutine, wherein the vehicle control unit obtains velocity information from the at least one implement velocity sensor, wherein the second subroutine of the vehicle control unit uses the velocity information to limit the maximum drivetrain torque.

10. The construction vehicle of claim 1, wherein the power management actuator comprises one of a pedal, a button, and a hand-actuated lever.

11. A method of operating a construction vehicle comprising providing a construction vehicle having at least one traction device, an engine, an engine controller operably coupled to the engine, a drivetrain operably coupled to the at least one traction device and engine for powering the at least one traction device, a transmission controller operably coupled to the drivetrain, a boom implement configured to be raised and lowered to move material, and a hydraulic system for providing power to the boom implement,
obtaining a ground speed of the vehicle from the transmission controller,
using the ground speed of the vehicle to determine a maximum drivetrain torque for the ground speed,
sending a message to the transmission controller commanding the maximum drivetrain torque, the transmission controller preventing too much power from being delivered to the drivetrain for the ground speed obtained by the transmission controller by decreasing the engine power to the at least one traction device in response to sending the message, and increasing the engine power to the hydraulic system and the boom implement while decreasing the engine power to the at least one traction device.

12. The method of claim 11 further comprising steps of obtaining engine speed data from the engine controller; and
using the engine speed data in determining the maximum drivetrain torque.

13. The method of claim 12 further comprising steps of obtaining a power management input from a power management actuator coupled to a vehicle control unit; and
using the power management input in determining the maximum drivetrain torque.

14. The method of claim 13 further comprising steps of obtaining implement velocity data and implement control lever position data from the power management actuator; and
using the implement velocity data in determining the maximum drivetrain torque when the vehicle control unit uses implement control lever position data to command movement of the vehicle implement.

15. The method of claim 11 further comprising steps of obtaining power management input from a power management actuator; and
    using the power management input in determining the maximum drivetrain torque.

16. The method of claim 11 further comprising a step of obtaining implement velocity data and implement control lever position data from the power management actuator.

17. The method of claim 16 further comprising a step of using the implement velocity data when the implement control lever position data commands movement of a vehicle implement in determining the maximum drivetrain torque.

18. A construction vehicle comprising:
    at least one traction device,
    an engine,
    an engine controller operably coupled to the engine,
    a drivetrain operably coupled to the at least one traction device and engine for powering the at least one traction device,
    a transmission controller operably coupled to the drivetrain and configured to obtain vehicle ground speed data,
    an implement configured to be manipulated to move material,
    a hydraulic system for providing power to the implement,
    an implement control lever configured to control movement of the implement,
    an implement velocity sensor configured to detect a velocity of the implement,
    a power management actuator, and
    a vehicle control unit in communication with the engine controller, the transmission controller, and the power management actuator, the vehicle control unit configured to receive implement velocity data from the implement velocity sensor and implement control lever position data from the implement control lever, the vehicle control unit determining a maximum drivetrain torque based on the vehicle ground speed data and the implement velocity data when the implement control lever position data commands movement of the implement, wherein the vehicle control unit communicates the maximum drivetrain torque to the transmission controller to reduce engine power to the transmission and to increase engine power to the hydraulic system and the implement.

19. The construction vehicle of claim 18, wherein the implement velocity sensor comprises one of a cylinder position sensor and a flow meter.

* * * * *

UNITED STATES PATENT AND TRADEMARK OFFICE
CERTIFICATE OF CORRECTION

| | | |
|---|---|---|
| PATENT NO. | : 9,126,598 B2 | Page 1 of 1 |
| APPLICATION NO. | : 11/446626 | |
| DATED | : September 8, 2015 | |
| INVENTOR(S) | : Jahmy Hindman et al. | |

It is certified that error appears in the above-identified patent and that said Letters Patent is hereby corrected as shown below:

ON THE TITLE PAGE
Page 1, inventor Christopher G. Parish's city of residence, replace "Ashbury" with -- Asbury --
Page 1, inventor Jeremiah J. Bock's city of residence, replace "Ashbury" with -- Asbury --

Signed and Sealed this
Fifth Day of January, 2016

Michelle K. Lee
*Director of the United States Patent and Trademark Office*